W. A. TURBAYNE.
STARTING, GENERATING, AND BRAKING SYSTEM.
APPLICATION FILED NOV. 23, 1917.
1,365,130.
Patented Jan. 11, 1921.
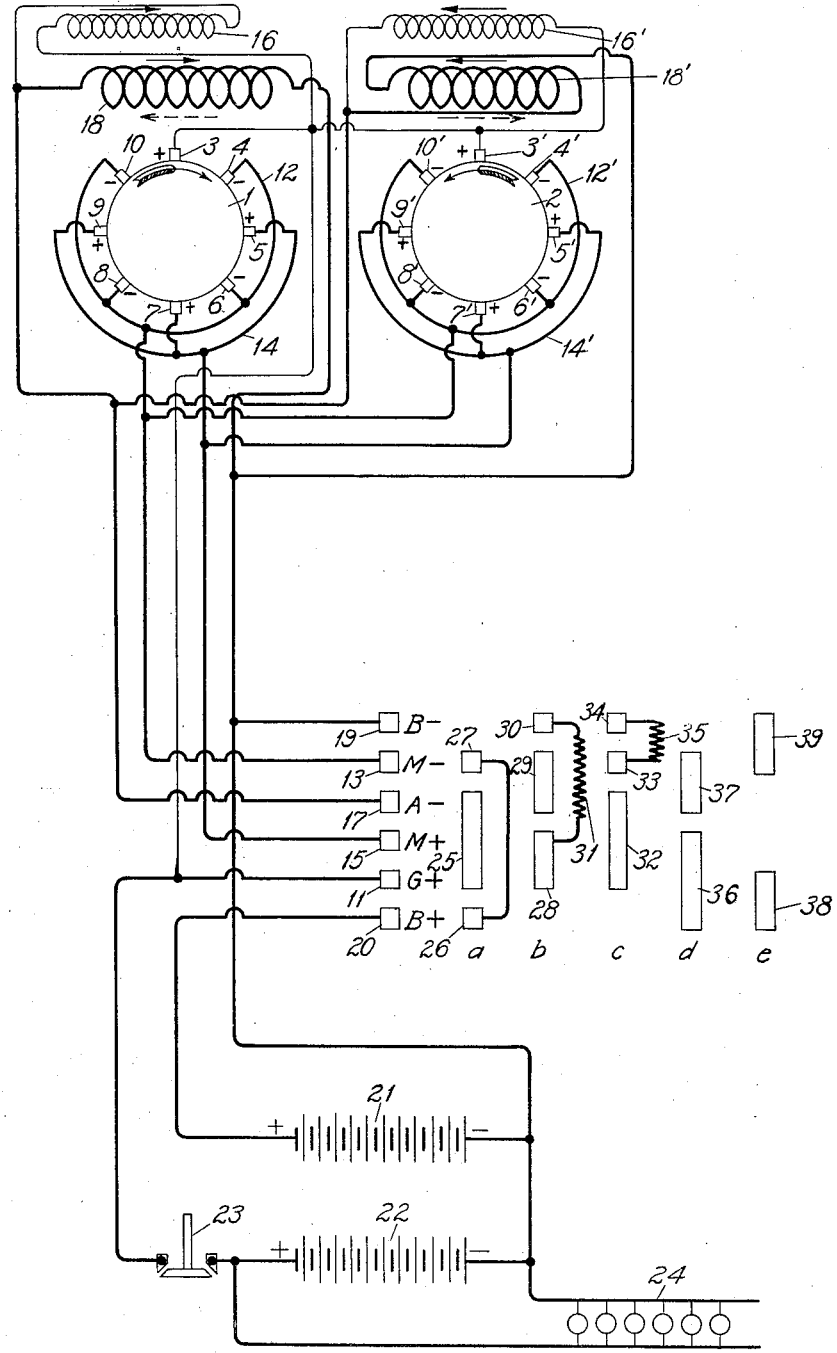
WITNESS:
Romaine A. Kinne
Ralph Munden
INVENTOR.
William A. Turbayne.
BY Raymond H. Van Vert
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STARTING, GENERATING, AND BRAKING SYSTEM.

1,365,130.  Specification of Letters Patent.  Patented Jan. 11, 1921.

Application filed November 23, 1917. Serial No. 203,481.

*To all whom it may concern:*

Be it known that I, WILLIAM A. TURBAYNE, a citizen of the United States, residing at Niagara Falls, in the county of Niagara and State of New York, have invented new and useful Improvements in Starting, Generating, and Braking Systems, of which the following is a specification.

The present invention relates to starting, generating and braking systems.

More particularly the present invention relates to systems involving an internal combustion engine which is adapted to supply current for battery charging and for lighting purposes in which the engine is started by energy delivered by the storage battery. In certain systems, particularly those used in marine service, it is desirable to provide means for braking the motion of the engine and its attached parts. Accordingly, the present invention involves an internal combustion engine, a dynamo-electric machine, a storage battery and connections whereby the dynamo-electric machine, receiving energy from the storage battery, may start said engine, in which the dynamo electric machine may be operated from the engine to charge the storage battery and in which connections may be made whereby the dynamo-electric machine will have a powerful braking action.

An object of the present invention is to provide a system which will be reliable in operation and in which braking will be accomplished magnetically.

A further object is to provide a system suitable for service on a boat whereby the engine may be quickly started and quickly reversed and in which effectual braking is accomplished either in the forward or reverse direction.

A further object is to provide a starting, generating and braking system involving a dynamo-electric machine and a translation circuit, in which the starting and braking operations may be performed without reflecting on the translation circuit.

Further objects will be apparent as the description proceeds.

The one figure of the drawings represents diagrammatically one embodiment of the present invention. The numerals 1 and 2 represent the armatures of a pair of dynamo-electric machines which may be connected to separate internal combustion engines, which engines may in turn be connected to propellers. As indicated, these two armatures will have opposite directions of rotation in their normal operation. As far as the electrical system is concerned, no different principles are involved with the two dynamo-electric machines from those involved with a single dynamo-electric machine, as it will be noted that the two machines disclosed are connected in parallel. The dynamo-electric machines chosen for illustration have a plurality of brushes 3, 4, 5, 6, 7, 8, 9 and 10, and 3', 4', 5', 6', 7', 8', 9' and 10' respectively. The brushes 3 and 3' are connected to a common point and to the stationary contact 11. Brushes 4, 6, 8 and 10 are all connected together to a common conductor 12, while brushes 4', 6', 8' and 10' are connected together to a common conductor 12'. Conductors 12 and 12' are connected to a common point and to the stationary contact 13. Brushes 5, 7 and 9 are connected to a common conductor 14, while brushes 5', 7' and 9' are connected to a common conductor 14'. Conductors 14 and 14' are connected to a common point and to the stationary contact 15. Brushes 3 and 3' are connected to the shunt field windings 16 and 16' respectively of the two dynamo-electric machines, the other terminals of said field windings 16 and 16' being connected to the stationary contact 17. The two dynamo-electric machines are each provided with a series field winding 18 and 18'. One terminal of each of these series field windings 18 and 18' is connected to the stationary contact 17, while the other ends of each of the series field windings 18 and 18' are connected to the stationary contact 19. Another stationary contact 20 is provided which is connected to one terminal of the storage battery 21, the other terminal of which is connected to the fixed contact 19. A second storage battery 22 is provided, one terminal of which is connected to the stationary contact 19, while the other terminal is connected through the automatic switch 23 to the stationary contact 11. A terminal of battery 21 is thus permanently connected to a like terminal of battery 22. The automatic switch 23 may be of any preferred type. It should close when a sufficient voltage is being developed by the armatures 1 and 2 to charge the storage battery 22 and should be open when a lower voltage is being developed by said armatures. The translation circuit 24 is connected across the terminals of the storage battery 22.

The stationary contacts 19, 13, 17, 15, 11 and 20, may coöperate with the several contacts of a drum controller. The development of a suitable drum controller is illustrated in the drawing. Said drum controller has a plurality of sets of contacts indicated as $a$, $b$, $c$, $d$ and $e$. The set $a$ is provided with a contact 25 which is adapted to contact with fixed contacts 11, 15 and 17. The combination $a$ is also provided with a contact 25 adapted to contact with fixed contacts 20 and with a contact 27 adapted to contact with fixed contact 13. Said contacts 26 and 27 are connected together by means of a low resistance conductor.

The combination of contacts indicated as $b$ includes a contact 28 adapted to contact with fixed contacts 11 and 15; a contact 29 adapted to contact with fixed contacts 13 and 17, and a contact 30 adapted to contact with fixed contact 19. Contacts 28 and 30 may be connected together through a resistance 31.

The combination $c$ includes a contact 32 adapted to contact with fixed contacts 11, 15, 17 and a pair of contacts 33 and 34, adapted to contact respectively with fixed contacts 13 and 19. Contacts 33 and 34 are connected together through a resistance 35.

The combination $d$ includes a contact 36 adapted to contact with fixed contacts 20, 11 and 15 and a contact 37 adapted to contact with fixed contacts 17 and 13.

The combination $e$ includes a contact 38 adapted to contact with fixed contacts 20 and 11 and a contact 39 adapted to contact with fixed contacts 13 and 19.

The combination of contacts marked $a$ will be moved into contact with the fixed contacts 19, 13, 17, 15, 11 and 20 for reverse running.

The combination $b$ will be moved into contacting position for forward braking. This position of the drum controller is also an off position.

The combination $c$ may be thrown into contact making position for reverse braking. This is also an off position.

The combination $d$ may be moved into contact making position for forward starting.

The combination $e$ may be moved into contact making position for forward running and generating.

Inasmuch as the two dynamo-electric machines are identical, only one need be referred to specifically by reference numerals in describing the operation of the system.

Considering the dynamo-electric machine at the left hand side of the figure, brushes 3, 5, 7 and 9 are positive brushes, whereas brushes 4, 6, 8 and 10 are negative brushes.

When it is desired to operate the dynamo-electric machine as a motor, current is delivered to all of the positive brushes and after circulating through the armature conductors, leaves by the negative brushes. Under generating conditions brush 3 will have one polarity, while brushes 4, 6, 8 and 10 will have the opposite polarity. The particular dynamo-electric machine chosen for illustration has valuable regulating characteristics which, however, form no part of the present invention and need not be explained herein. Any preferred type of dynamo-electric machine may be used but should preferably have a shunt field winding and a series field winding. It has not been considered necessary to illustrate internal combustion engines which are connected to the two dynamo-electric machines, nor has it been considered necessary to illustrate propellers. It will be sufficient to state that the internal combustion engines should be of a type which may be reversed. Such reversal should take place automatically upon reversal in the direction of armature rotation. Such automatic reversing arrangements are well known. In the operation of the system illustrated, when the mechanism is at rest, the drum controller will be in such a position that either combination $b$ or combination $c$ is in contact-making position. When the operator desires to start the mechanism in the forward direction, he will move the controller to the position in which the combination $d$ is in contact-making position. Circuit may now be traced from the positive terminal of the storage 21 through contacts 20, 36 and 15 to conductor 14, which leads to the positive brushes 5, 7 and 9. Circuit may also be traced through contact 11 to positive brush 3. The current will circulate through the armature conductors to the negative brushes 4, 6, 8 and 10, whence it will be led through conductor 12 to contact 13. From contact 13 circuit may be traced through contacts 37 and 17, through the series winding 18, back to the negative terminal of the storage battery 21. From contact 11, circuit may also be traced through shunt field winding 16, whence a return circuit may be traced through the series field winding 18 to the negative terminal of the storage battery 21. Windings 16 and 18 will thus both be energized and will set up fluxes whose direction may be indicated by the full line arrows. The dynamo-electric machine will thus be operated as a motor with a high torque to start the internal combustion engine. After the engine has been started, the operator will move the drum controller into a position in which the combination $e$ is in contact-making position. Circuit may now be traced from the positive brush 3 to one side of the automatic switch 23 and from the negative brushes 4 and 10 through the conductor 12, contacts 13, 39 and 19, to the negative side of the storage battery 22. When the dynamo-electric machine is being operated at a speed sufficient to develop a voltage equal to or greater than the C. E. M. F. of the storage battery 22, said automatic switch 23 will automatically close, throwing said storage battery 22 on charge. Circuit may also be traced from positive brush 3, through contacts 11, 38 and 20, to the positive terminal of storage battery 21, whence circuit may be traced through the contacts 19, 39 and 13, to the negative brushes 4 and 10. Provision is therefore made for the recharging of both batteries. The field excitation will be provided under these conditions by the shunt field winding 16 which is connected to one side of the positive brush 3, and on the other side, through series field winding 18, through contacts 19, 39 and 13 to the negative brushes 4 and 10. Energy will now be provided by the dynamo-electric machine to charge the two storage batteries 21 and 22 in parallel. The energy which is stored in the storage battery 21 will be used for starting purposes, whereas energy stored in the battery 22 will be used for lighting purposes. Inasmuch as the two storage batteries are used, no fluctuations in the translation circuit will occur during the time that a heavy draft is being made upon the storage battery 21.

When the operator desires to stop the forward running and to brake the mechanism, he will throw the drum controller into the position in which the combination $b$ is in contact-making position. With the connections thus made, the dynamo-electric machine will build up as a series generator, short-circuited through the resistance 31. At this time, circuit may be traced from positive brush 3, through contact 11, contact 28, resistance 31, contact 30, contact 19, through the series field winding 18 in a direction opposite to that traced under the forward starting position, through contacts 17, 29 and 13, to the negative brushes 10 and 4. Circuit may also be traced from the positive brushes 5, 7 and 9, through contacts 15 and 28, resistance 31, contacts 30 and 19, through said series field winding 18. The direction of the flux set up by the series field winding 18 will be as indicated by the dotted arrows. Inasmuch as the dynamo-electric machine shown is a series generator, short-circuited through resistance 31, it will have an effectual braking action. The mechanism will thus be brought quickly to a stop. If the operator desires to reverse, he will move the drum controller into the position in which combination $a$ is in contact-making position. Circuit may now be traced from the positive terminal of storage battery 21, through contacts 20, 26, 27 and 13, to brushes 4, 6, 8 and 10, through the armature conductor to the brushes 3, 5, 7 and 9. From brushes 5, 7 and 9, circuit may be traced through conductor 14, contacts 15, 25 and 17, through the series field winding 18 in the same direction as for forward starting, to the negative terminal of storage battery 21. From brush 3, circuit may be traced from shunt field winding 16 in the same direction as for forward starting, from series field winding 18 to the negative terminal of storage battery 21. It will thus be seen that the direction of current from the armature is reversed, while the direction of current through the field windings is unchanged from forward starting. Therefore, the dynamo-electric machine will be rotated in a reverse direction. Inasmuch as in most service there will be very little reverse running, no provision is made herein for charging the storage battery during such reverse running. If the operator desires to stop the mechanism when it is running in a reverse direction, he will move the drum controller in the position in which combination $c$ is in contact-making position, in which case the generator will operate as a series generator, short circuited through the resistance 35. Circuit may now be traced from the brushes 6, 8 and 10, through conductor 12 to contact 13. From contact 13 circuit may be traced through contact 23, resistance 35, contacts 34 and 19, through series field winding 18, in a direction to set up a flux indicated by the dotted line arrow. Circuit may be traced from the series field winding 18, through contacts 17, 32 and 15, back to brushes 5, 7 and 9. Circuit may also be traced from contact 32, through contact 11 to the brush 3. Inasmuch as the dynamo-electric machine will now operate as a series generator, short-circuited through the resistance 35, the mechanism will be quickly stopped. Though the circuits have been traced relative to the dynamo-electric machine on the left hand side of the figure, it will be clear that the description applies to both dynamo-electric machines, since they are connected in parallel. Each position of the drum controller will make the same connections for both dynamo-electric machines.

It will be clear that the invention provides means for quickly starting, quickly stopping and quickly reversing, with means for keeping the storage batteries charged, and that the parts are so arranged that no dimming of the lights will occur when the starting operation is being performed.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent of the United States is:—

1. In a system of propulsion, a starting and generating dynamo-electric machine, a pair of storage batteries, a translation circuit adapted to be supplied by only one of said batteries, said dynamo-electric machine being connected to be supplied from the other only of said batteries for motoring purposes, said machine being connected to charge both said batteries, and means for causing said machine to operate as a series generator for braking purposes.

2. In a system, in combination, a dynamo-electric machine having a series and shunt winding and adapted to have engine-starting functions, a storage battery, said machine being adapted to charge said battery, and means whereby said machine may operate as a series generator for braking purposes.

3. In a system, in combination, a dynamo-electric machine and a storage battery, selective switching means whereby said battery may be connected to said machine to cause said machine to operate in either a forward or reverse direction, said switching means being adapted to connect said machine to operate as a series generator for braking purposes during either forward or reverse rotation.

4. In a system, in combination, a pair of storage batteries, a translation circuit, a dynamo-electric machine, selective means for connecting one of said batteries to said machine to cause operation of said machine in either a forward or a reverse direction, switching means for connecting both of said batteries to said machine for charging, and switching means for connecting said dynamo-electric machine as a series generator for braking purposes.

5. In combination, a dynamo-electric machine adapted to have engine-starting functions in both forward and reverse directions of rotation, said machine being also adapted to have battery charging functions, a battery to be charged, and means for completing a braking circuit for the armature of said machine.

6. In combination, a dynamo-electric machine adapted to have engine starting functions and also adapted to have battery charging functions, a battery to be charged, and means for causing said machine to operate as a series generator for braking purposes.

In witness whereof, I have hereunto subscribed my name.

WILLIAM A. TURBAYNE.